(12) United States Patent  
George et al.

(10) Patent No.: US 11,514,897 B2
(45) Date of Patent: Nov. 29, 2022

(54) SYSTEMS AND METHODS RELATING TO BOT AUTHORING BY MINING INTENTS FROM NATURAL LANGUAGE CONVERSATIONS

(71) Applicant: GENESYS TELECOMMUNICATIONS LABORATORIES, INC., Daly City, CA (US)

(72) Inventors: Basil George, Hyderabad (IN); Ramasubramanian Sundaram, Hyderabad (IN)

(*) Notice: Subject to any disclaimer, the term of this patent is extended or adjusted under 35 U.S.C. 154(b) by 55 days.

(21) Appl. No.: 17/218,426

(22) Filed: Mar. 31, 2021

(65) Prior Publication Data

US 2022/0101838 A1 Mar. 31, 2022

Related U.S. Application Data

(60) Provisional application No. 63/083,561, filed on Sep. 25, 2020.

(51) Int. Cl.
*G06F 40/30* (2020.01)
*G10L 15/08* (2006.01)
(Continued)

(52) U.S. Cl.
CPC ...... *G10L 15/1822* (2013.01); *G06F 16/2465* (2019.01); *G06F 16/3329* (2019.01);
(Continued)

(58) Field of Classification Search
None
See application file for complete search history.

(56) References Cited

U.S. PATENT DOCUMENTS 8,688,453 B1 * 4/2014 Joshi .............. G10L 15/00 707/738
9,473,637 B1 * 10/2016 Venkatapathy ....... G06F 40/216
(Continued)

FOREIGN PATENT DOCUMENTS

WO 2019118377 A1 6/2019

OTHER PUBLICATIONS

PCT International Search Report and Written Opinion received for co-pending PCT application No. PCT/US2021/052125 dated Dec. 14, 2021.
(Continued)

*Primary Examiner* — Richard Z Zhu

(57) ABSTRACT

A method for intent mining that includes: receiving conversation data; using an intent mining algorithm to automatically mine intents from the conversation data; and uploading the mined intents into the conversational bot. The intent mining algorithm may include: analyzing utterances of the conversation data to identify intent-bearing utterances; analyzing the identified intent-bearing utterances to identify candidate intents; selecting salient intents from the candidate intents; grouping the selected salient intents into salient intent groups in accordance with a degree of semantic similarity; for each of the salient intent groups, selecting one of the salient intents as the intent label and designating the
(Continued)

others as the intent alternatives; and associating the intent-bearing utterances with the salient intent groups via determining a degree of semantic similarity between the candidate intents present in the intent-bearing utterance and the intent alternatives within each group.

26 Claims, 7 Drawing Sheets

(51) Int. Cl.
| | |
|---|---|
| *G10L 15/18* | (2013.01) |
| *G06F 16/2458* | (2019.01) |
| *G06N 5/02* | (2006.01) |
| *G06Q 30/00* | (2012.01) |
| *G10L 15/19* | (2013.01) |
| *G06F 16/35* | (2019.01) |
| *G06F 16/332* | (2019.01) |
| *G06F 40/289* | (2020.01) |
| *G06F 40/284* | (2020.01) |
| *G06F 40/205* | (2020.01) |
| *G06F 40/216* | (2020.01) |
| *G06F 40/35* | (2020.01) |
| *G06F 40/295* | (2020.01) |

(52) U.S. Cl.
CPC ............ *G06F 16/353* (2019.01); *G06F 40/30* (2020.01); *G06N 5/02* (2013.01); *G06Q 30/016* (2013.01); *G10L 15/1815* (2013.01); *G10L 15/19* (2013.01); *G06F 40/205* (2020.01); *G06F 40/216* (2020.01); *G06F 40/284* (2020.01); *G06F 40/289* (2020.01); *G06F 40/295* (2020.01); *G06F 40/35* (2020.01); *G06F 2216/03* (2013.01)

(56) References Cited

U.S. PATENT DOCUMENTS

| | | | |
|---|---|---|---|
| 9,922,642 B2 * | 3/2018 | Pitschel | G10L 15/22 |
| 9,959,340 B2 * | 5/2018 | Li | G06F 16/334 |
| 10,346,540 B2 | 7/2019 | Karov et al. | |
| 10,354,677 B2 * | 7/2019 | Mohamed | G10L 25/63 |
| 10,445,745 B1 | 10/2019 | Chopra et al. | |
| 10,708,425 B1 | 7/2020 | Hernandez | |
| 10,978,053 B1 * | 4/2021 | Smythe | G10L 13/02 |
| 11,152,002 B2 * | 10/2021 | Walker, II | G10L 15/22 |
| 11,380,310 B2 * | 7/2022 | Acero | G10L 15/1822 |
| 2003/0167167 A1 * | 9/2003 | Gong | G10L 13/033 |
| | | | 704/250 |
| 2005/0105712 A1 * | 5/2005 | Williams | G10L 13/027 |
| | | | 704/275 |
| 2015/0073798 A1 | 3/2015 | Karov et al. | |
| 2018/0253638 A1 * | 9/2018 | Maga | G06F 16/90332 |
| 2018/0307675 A1 * | 10/2018 | Akkiraju | G06N 20/00 |
| 2021/0157990 A1 * | 5/2021 | Lima | H04L 51/02 |

OTHER PUBLICATIONS

Ajay Chatterjee et al., "Intent Mining From Past Conversations for Conversational Agent", ARXIV.org, Cornell University Library, 201 Olin Library Cornell University, Ithaca, NY 14853, May 22, 2020, XP081676639.

PCT International Search Report and Written Opinion received for co-pending PCT application No. PCT/US2021/052127 dated Jan. 18, 2022.

* cited by examiner

US 11,514,897 B2

SYSTEMS AND METHODS RELATING TO BOT AUTHORING BY MINING INTENTS FROM NATURAL LANGUAGE CONVERSATIONS

CROSS REFERENCE TO RELATED APPLICATION

This application claims the benefit of U.S. Provisional Patent Application No. 63/083,561, titled "SYSTEMS AND METHODS RELATING TO BOT AUTHORING AND/OR AUTOMATING THE MINING OF INTENTS FROM NATURAL LANGUAGE CONVERSATIONS", filed in the U.S. Patent and Trademark Office on Sep. 25, 2020, the contents of which are incorporated herein.

BACKGROUND

The present invention generally relates to telecommunications systems in the field of customer relations management including customer assistance via internet-based service options. More particularly, but not by way of limitation, the present invention pertains to systems and methods for automating a bot authoring workflow and/or implementing an intent mining process for mining of intents and associated utterances from natural language conversation data.

BRIEF DESCRIPTION OF THE INVENTION

The present invention includes a computer-implemented method for authoring a conversational bot and intent mining is provided. The method may include: receiving conversation data, with the conversation data including text derived from conversations between a customer and a customer service representative; using an intent mining algorithm to automatically mine intents from the conversation data, each of the mined intents including an intent label, intent alternatives, and associated utterances; and uploading the mined intents into the conversational bot and using the conversational bot to conduct automated conversations with other customers. The intent mining algorithm may include: analyzing utterances occurring within the conversations of the conversation data to identify intent-bearing utterances, with the utterances each including a turn within the conversations whereby the customer, in the form of a customer utterance, or the customer service representative, in the form of a customer service representative utterance, is communicating, and an intent-bearing utterance is defined as one of the utterances determined to have an increased likelihood of expressing an intent; analyzing the identified intent-bearing utterances to identify candidate intents, with the candidate intents each identified as being a text phrase occurring within one of the intent-bearing utterances that has two parts: an action, which may include a word or phrase describing a purpose or task, and an object, which may include a word or phrase describing an object or thing upon which the action operates; selecting, in accordance with one or more criteria, salient intents from the candidate intents; grouping the selected salient intents into salient intent groups in accordance with a degree of semantic similarity between the salient intents; for each of the salient intent groups, selecting one of the salient intents as the intent label and designating the other of the salient intents as the intent alternatives; and associating the intent-bearing utterances with the salient intent groups via determining a degree of semantic similarity between the candidate intents present in the intent-bearing utterance and the intent alternatives within each of the salient intent groups.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
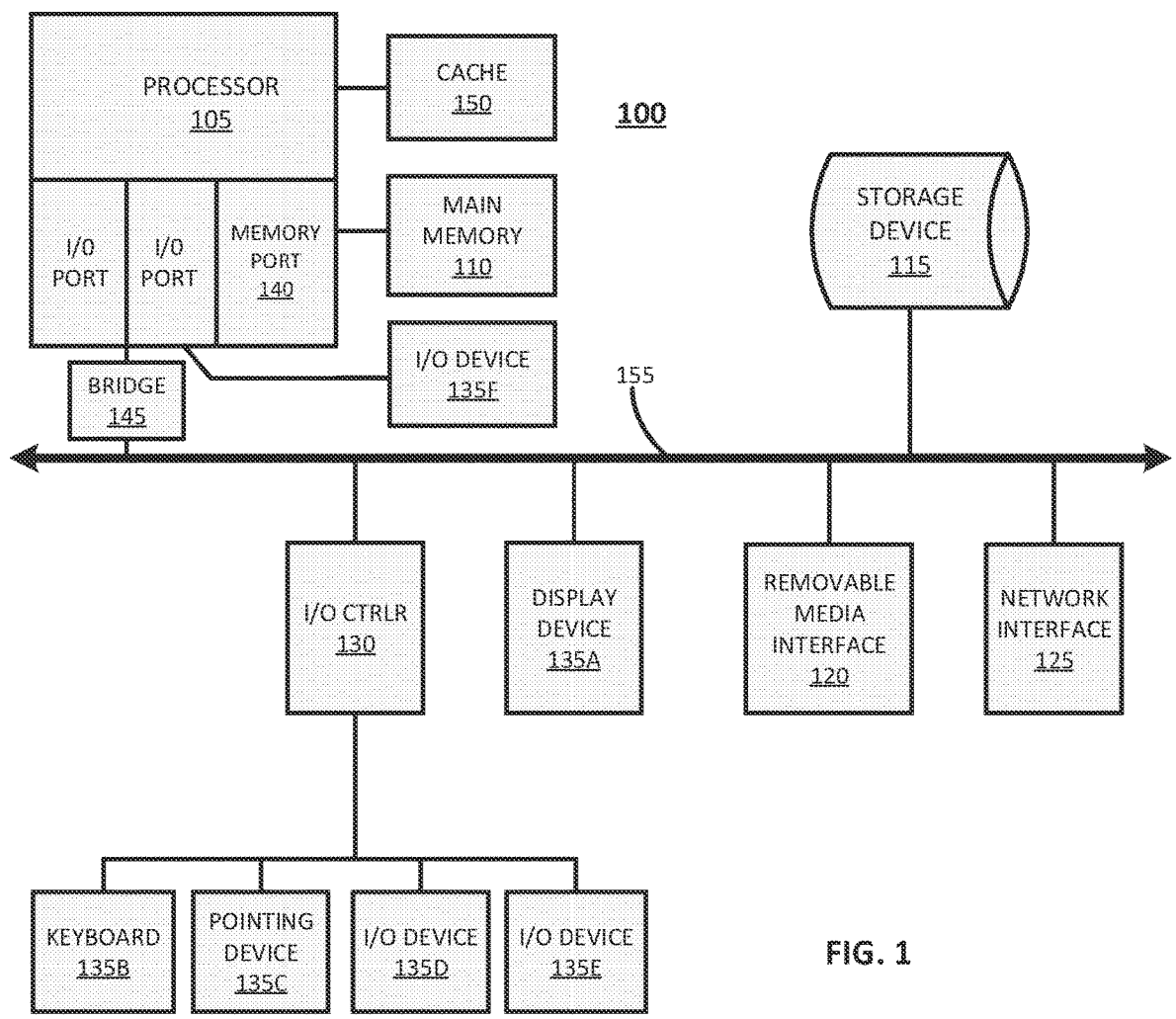
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be a private or public switched telephone network (PSTN), wireless carrier network, local area network (LAN), private wide area network (WAN), public WAN such as the Internet, etc., with connections being established using appropriate communication protocols. More generally, it should be understood that, unless otherwise limited, the computing device 100 may communicate with other computing devices 100 via any type of network using any conventional communication protocol. Further, the network may be a virtual network environment where various network components are virtualized. For example, the various machines may be virtual machines implemented as a software-based computer running on a physical machine, or a "hypervisor" type of virtualization may be used where multiple virtual machines run on the same host physical machine. Other types of virtualization are also contemplated.

Contact Center

Figure 2:
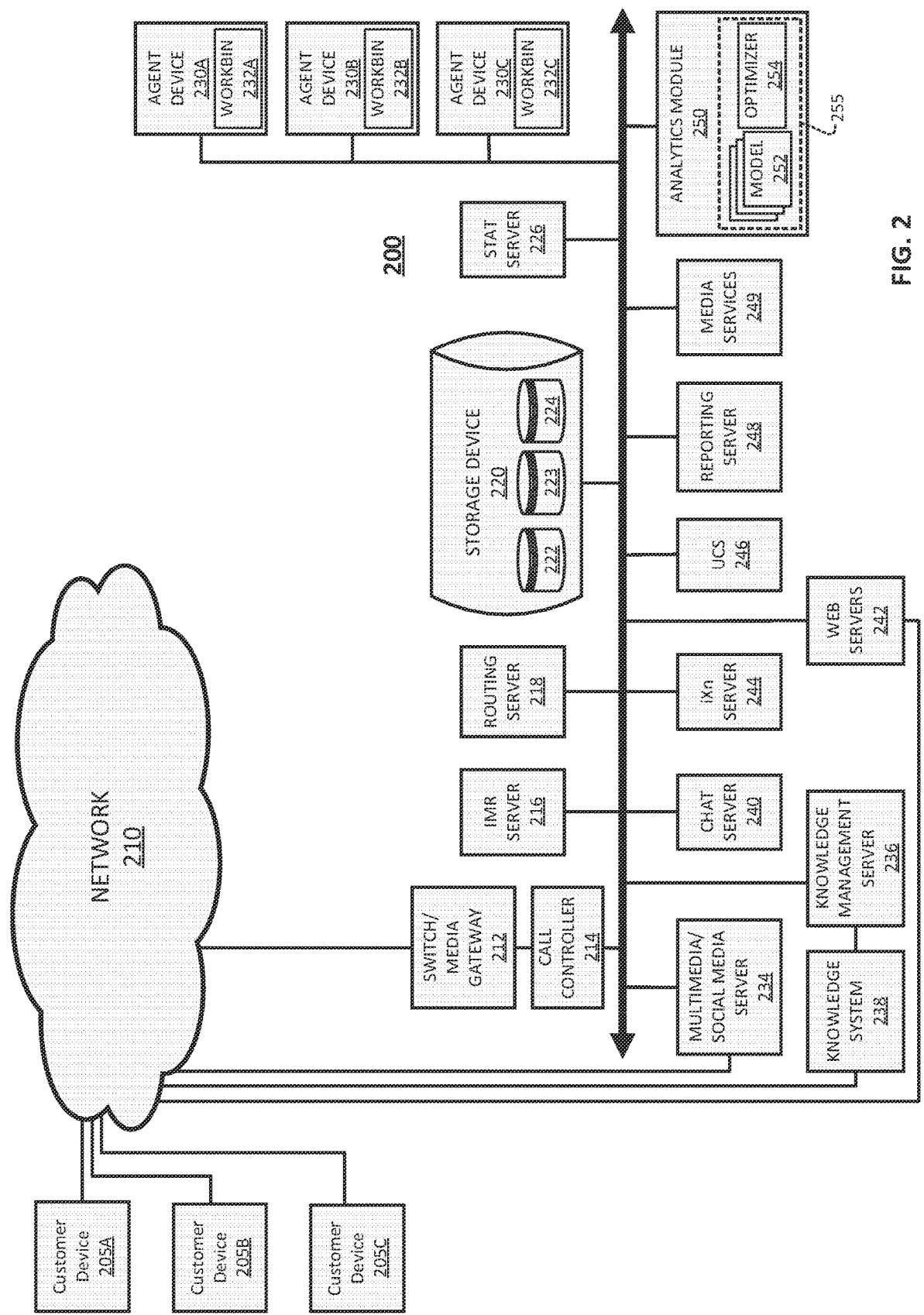
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like. v Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Chat Systems

Figure 3:
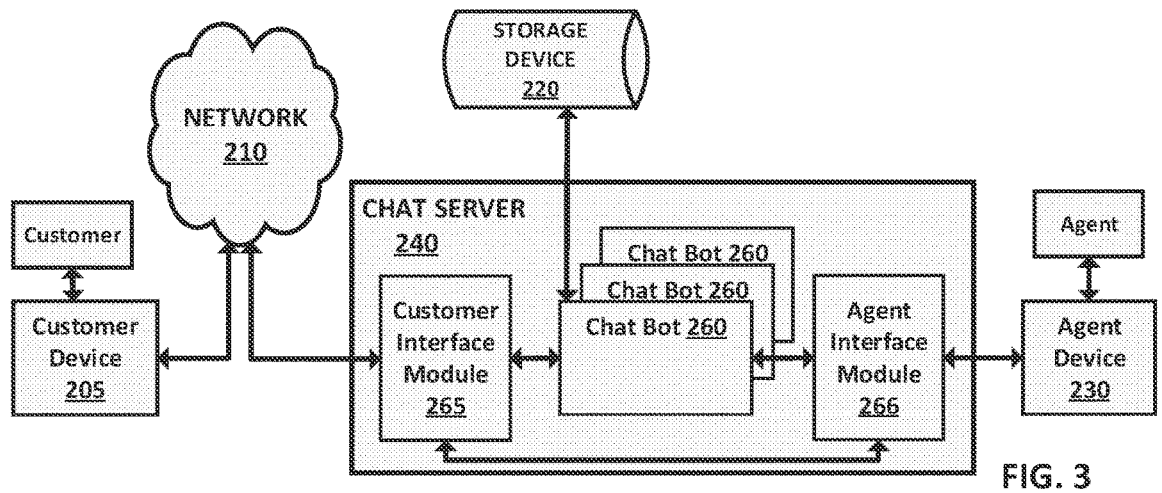
FIG. 3 is schematic block diagram showing further details of a chat server operating as part of the chat system according to embodiments of the present invention.
Figure 4:
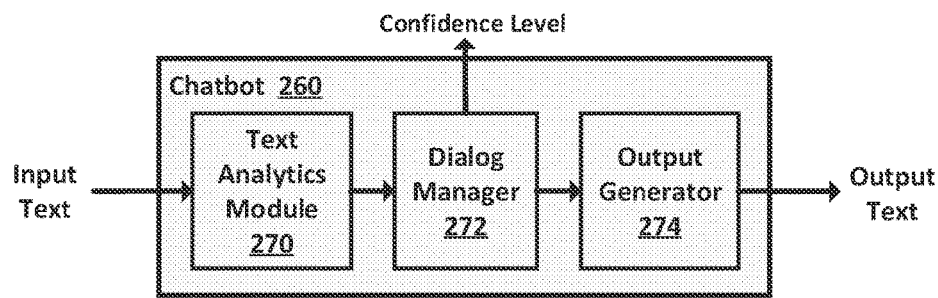
FIG. 4 is a schematic block diagram of a chat module according to embodiments of the present invention.
Figure 5:
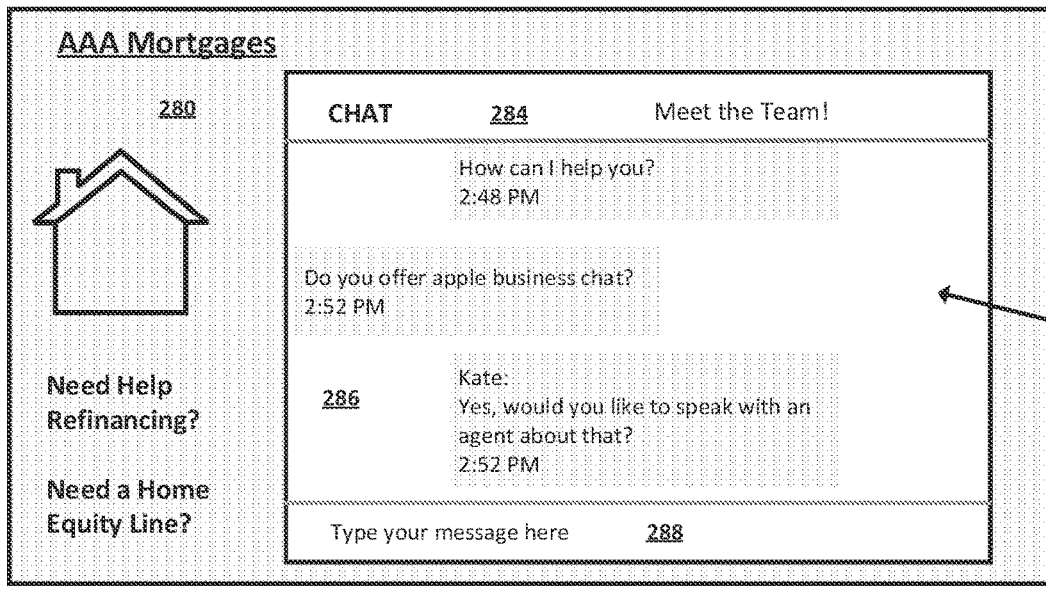
FIG. 5 is an exemplary customer chat interface according to embodiments of the present invention.

Turning to FIGS. 3, 4 and 5, various aspects of chat systems and chatbots are shown. As will be seen, present embodiments may include or be enabled by such chat features, which, in general, enable the exchange of text messages between different parties. Those parties may include live persons, such as customers and agents, as well as automated processes, such as bots or chatbots.

By way of background, a bot (also known as an "Internet bot") is a software application that runs automated tasks or scripts over the Internet. Typically, bots perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Before proceeding further with the description of the present invention, an explanatory note will be provided in regard to referencing system components—e.g., modules, servers, and other components—that have already been introduced in any previous figure. Whether or not the subsequent reference includes the corresponding numerical identifiers used in the previous figures, it should be understood that the reference incorporates the example described in the previous figures and, unless otherwise specifically limited, may be implemented in accordance with either that examples or other conventional technology capable of fulfilling the desired functionality, as would be understood by one of ordinary skill in the art. Thus, for example, subsequent mention of a "contact center system" should be understood as referring to the exemplary "contact center system 200" of FIG. 2 and/or other conventional technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as conventional technology for fulfilling the same functionality.

Chat features and chatbots will now be discussed in greater specificity with reference to the exemplary embodiments of a chat server, chatbot, and chat interface depicted, respectively, in FIGS. 3, 4, and 5. While these examples are provided with respect to chat systems implemented on the contact center-side, such chat systems may be used on the customer-side of an interaction. Thus, it should be understood that the exemplary chat systems of FIGS. 3, 4, and 5 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by a enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed more below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generating user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—band so will not be repeated here. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Reference will now be made to FIG. 5, in which a webpage 280 having an exemplary implementation of a chat feature 282 is presented. The webpage 280, for example, may be associated with an enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, such as the customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a text display area 286, which is the area dedicated to the chronological display of received and sent text messages. The customer chat interface 284 further includes a text input area 288, which is the designated area in which the customer inputs the text of their next message. As will be appreciated, other configurations are also possible.

Customer Automation Systems

Embodiments of the present invention include systems and methods for automating and augmenting customer actions during various stages of interaction with a customer service provider or contact center. As will be seen, those various stages of interaction may be classified as pre-contact, during-contact, and post-contact stages (or, respectively, pre-interaction, during-interaction, and post-interaction stages). With specific reference now to FIG. 6, an exemplary customer automation system 300 is shown that may be used with embodiments of the present invention. To better explain how the customer automation system 300 functions, reference will also be made to FIG. 7, which provides a flowchart 350 of an exemplary method for automating customer actions when, for example, the customer interacts with a contact center. Additional information related to customer automation are provided in U.S. application Ser. No. 16/151,362, filed on Oct. 4, 2018, entitled "System and Method for Customer Experience Automation", the content of which is incorporated herein by reference.

Figure 6:
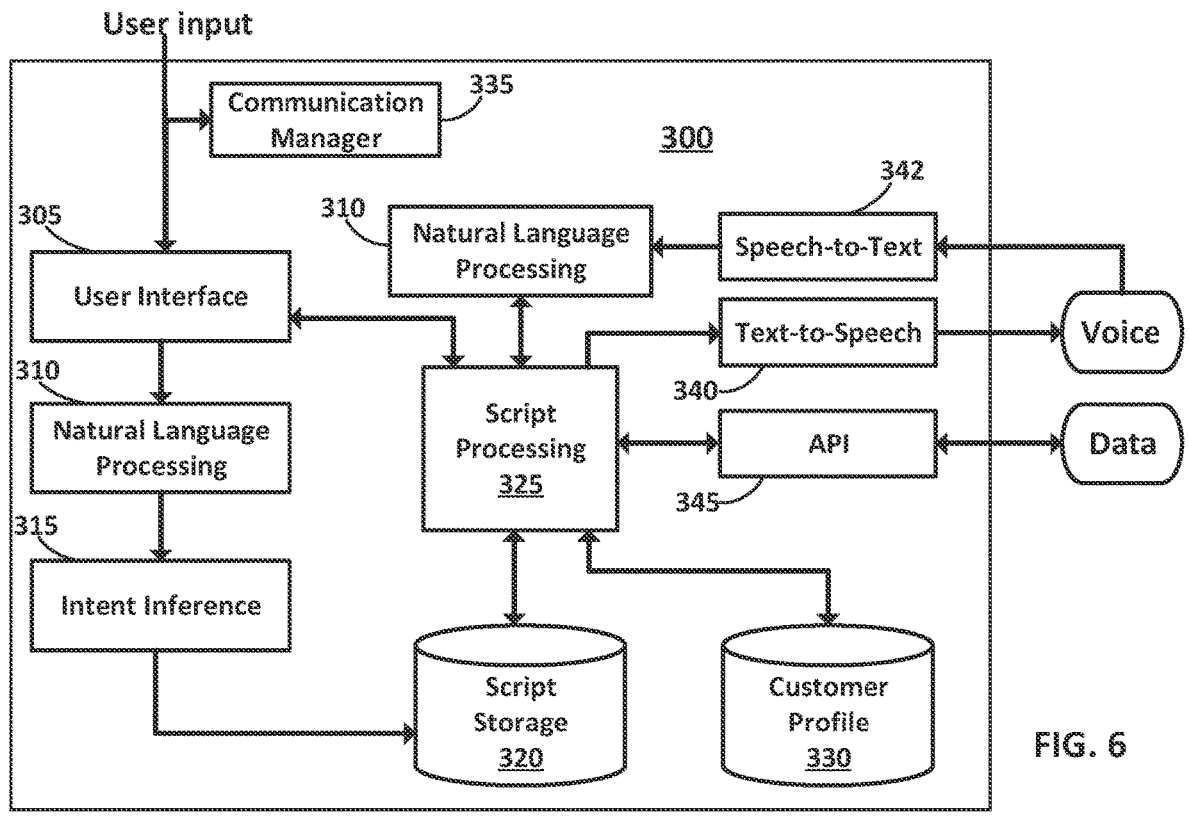
FIG. 6 is a block diagram of a customer automation system according to embodiments of the present invention.

The customer automation system 300 of FIG. 6 represents a system that may be generally used for customer-side automations, which, as used herein, refers to the automation of actions taken on behalf of a customer in interactions with customer service providers or contact centers. Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments are primarily described in the context of implementation via an application running on the customer device 205. However, it should be understood that present embodiments are not limited thereto.

The customer automation system 300 may include several components or modules. In the illustrated example of FIG. 6, the customer automation system 300 includes a user interface 305, natural language processing (NLP) module 310, intent inference module 315, script storage module 320, script processing module 325, customer profile database or module (or simply "customer profile") 330, communication manager module 335, text-to-speech module 340, speech-to-text module 342, and application programming interface (API) 345, each of which will be described with more particularity with reference also to flowchart 350 of FIG. 7. It will be appreciated that some of the components of and functionalities associated with the customer automations system 300 may overlap with the chatbot systems described above in relation to FIGS. 3, 4, and 5. In cases where the customer automation system 300 and such chatbot systems are employed together as part of a customer-side implementation, such overlap may include the sharing of resources between the two systems.

Figure 7:
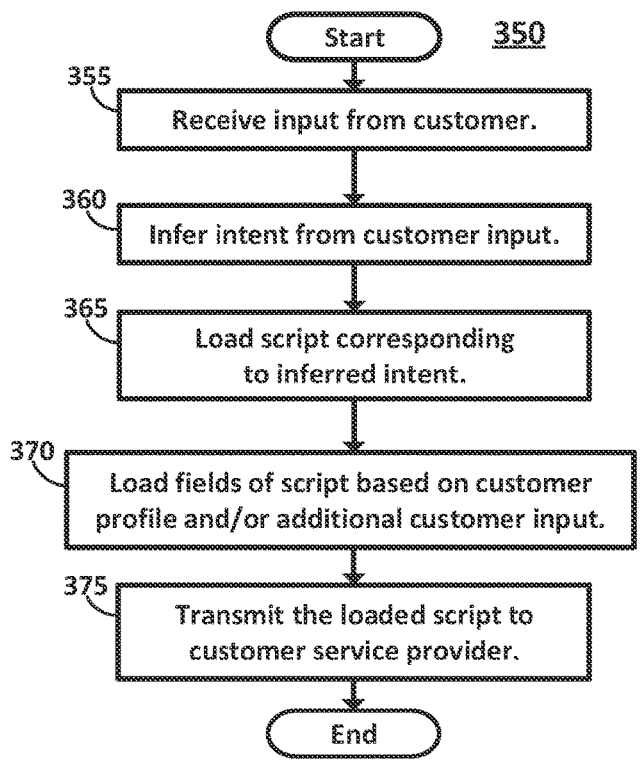
FIG. 7 is a flowchart of a method for automating an interaction on behalf of a customer according to embodiments of the present invention.

In an example of operation, with specific reference now to the flowchart 350 of FIG. 7, the customer automation system 300 may receive input at an initial step or operation 355. Such input may come from several sources. For example, a primary source of input may be the customer, where such input is received via the customer device. The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flow diagram 350, at an operation 360, the customer automation system 300 parses the natural language of the input using the NLP module 310 and, therefrom, infers an intent using the intent inference module 315. For example, where the input is provided as speech from the customer, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the provided input using artificial intelligence or machine learning techniques. Such artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand the intent from the input, a selection of several intents may be provided to the customer in the user interface 305. The customer may then clarify their intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. Such scripts may include a set of commands or operations, pre-written speech or text, and/or fields of parameters or data (also "data fields"), which represent data that is required to automate an action for the customer. For example, the script may include commands, text, and data fields that will be needed in order to resolve the issue specified by the customer's intent. Scripts may be specific to a particular contact center and tailored to resolve particular issues. Scripts may be organized in a number of ways, for example, in a hierarchical fashion, such as where all scripts pertaining to a particular organization are derived from a common "parent" script that defines common features. The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049 "Computing Suggested Actions in Caller Agent Phone Calls By Using Real-Time Speech Analytics and Real-Time Desktop Analytics," filed in the United States Patent and Trademark Office on Jan. 12, 2014, the entire disclosure of which is incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. The data for many of the data fields within the script may be automatically loaded with data retrieved from data stored within the customer profile 330. As will be appreciated, the customer profile 330 may store particular data related to the customer, for example, the customer's name, birth date, address, account numbers, authentication information, and other types of information relevant to customer service interactions. The data selected for storage within the customer profile 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, an API 345 is used so to interact with the contact center directly. Contact centers may define a protocol for making commonplace requests to their systems, which the API 345 is configured to do. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message.

Bot Authoring Using Intent Mining Automation

With several breakthroughs in Artificial Intelligence (AI) and computing technologies in recent years, there has been an increased interest in applications, automated systems, chat bots or bots that can engage in natural language conversations with humans. Recent years have witnessed a tremendous growth in the adoption of AI-powered chatbots and virtual assistants that can converse with humans naturally and perform a wide variety of tasks in a self-service fashion. Such conversational bots work by first analyzing a user's input and then trying to understand the meaning of that input. This is referred to as Natural Language Understanding (or "NLU") and typically involves the identification of a user's intention or "intent" and certain key words or "entities" in the user's input utterance. Once the intent and entities are determined, a bot can respond to a user with an appropriate follow-up action.

Various machine learning algorithms are used to train NLU models. Training typically involves teaching the system to recognize patterns present in natural language inputs and associate them with a pre-defined set of intents. The quality of training data is a critical factor in determining model performance. A sufficiently large data set, with adequate diversity in input utterances, is crucial for building good NLU models.

As used herein, the term "bot authoring" refers to the process of creating a conversational bot or chatbot with NLU capabilities. This process generally involves defining intents, identifying entities, formulating utterances, training NLU models, testing the bot and finally publishing it. This is usually a mostly manual process which may take weeks or months to complete. Generally, identifying intents and formulating utterances take most of this time. Although organizations may already possess large amounts of chat conversations between their customers and customer support staff, such as contact center agents, the process of manually going through these raw chat transcripts to identify intents and utterances cost both time and money.

As used herein, an intent mining engine or process (which may be referenced generally as a "intent mining process") is a system or method that makes the bot authoring workflow more efficient. As will be seen, the intent mining process of the present invention functions by mining intents from tens of thousands of conversations and finds a robust and diverse set of utterances belonging to each one. Further, the intent mining process helps to gain insights into the conversations by providing conversational analytics. It also provides the bot author with an opportunity to analyze intents and make modifications. Finally, these intents and utterances may be exported to diverse chatbot authoring platforms such as those commercially available in Genesys Dialog Engine, Google's Dialogflow, and Amazon Lex. As will be seen, this results in a flexible and efficient bot authoring workflow that significantly reduces overall development time.

Figure 8:
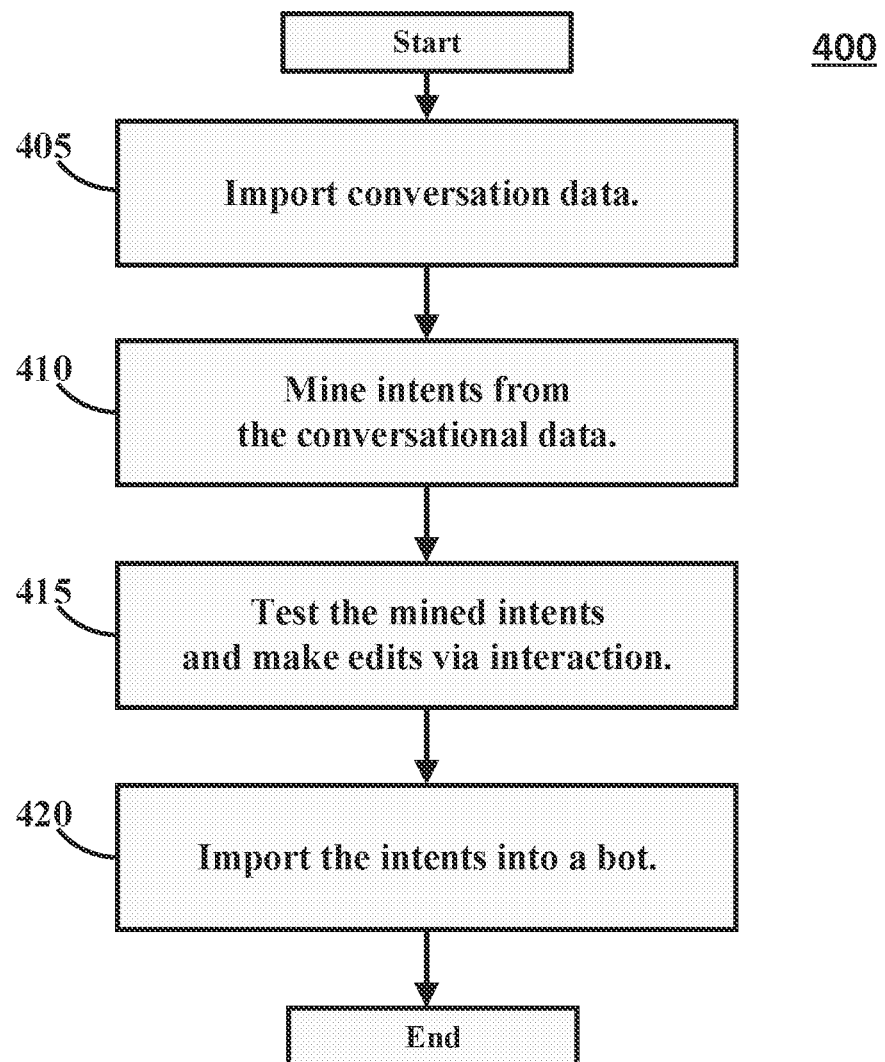
FIG. 8 is a workflow for authoring a conversational bot.

With reference now to FIG. 8, various stages or steps of bot authoring workflow 400 are shown using the intent mining process of the present invention (or simply "present intent mining process"). To initiate the workflow 400, conversations or conversation data may be imported for mining. Such conversations data may consist of previously occurring interactions between agents and customers. Such conversation data may be natural language conversations consisting of multiple back and forth messaging turns. The conversations, for example, may have occurred via a chat interface, through text, or via voice calls. In the case of the latter, the conversations may be transcribed into text via speech recognition before the mining begins.

At an initial step 405, the bot authoring workflow 400 may include importing conversation data (i.e., conversational text data) for use in the intent mining process. This may be done in several ways. For example, the conversational data may be imported via a text file (in a supported format like JSON) containing the conversations to be mined. The conversational data also may be imported from cloud storage.

At a step 410, the bot authoring workflow 400 may include mining the intents from the conversational data. As discussed in relation to FIGS. 9 and 10 below, the intents may be mined in accordance with an intent mining algorithm.

At a step 415, the bot authoring workflow 400 may include testing the mined intents. This may include interacting with the output of the intent mining process. That is, at this stage of the workflow, the bot author interacts with the mined output to make edits, which may include fine-tuning and pruning intents and associated utterances before exporting them into a bot for training. The bot author may perform various actions on the mined output, such as, for example: selecting an intent and the utterances that belong to that intent; merging two or more intents into a single intent, which may result in the merger of their chosen utterances; split an intent into multiple intents, which results in the splitting of corresponding utterances; and renaming intent labels. At the end of this business logic-driven process, a modified set of intents and associated utterances are produced that may then be used to train a chatbot.

At a step 420, the bot authoring workflow 400 may include importing the mined intents and utterances into the bot. For example, the mined intents may be uploaded into the conversational bot, and the conversational bot may be used to conduct automated conversations with customers. The present intent mining process may provide multiple ways to add mined or modified intents and utterances to bots. The data may be downloaded in CSV format for convenient review. The data can also be exported to multiple bot formats, thus providing support to a wider variety of conversational AI chatbot services, such as Genesys Dialog Engine, Google's Dialogflow or Amazon Lex.

The bot authoring process may also include additional steps. According to certain embodiments, the present intent mining process may be significantly involved in the steps already described above and less involved in later developmental stages. These later steps may include an optional editing step, a bot design step, and, finally, a final testing and publishing step.

Figure 9:
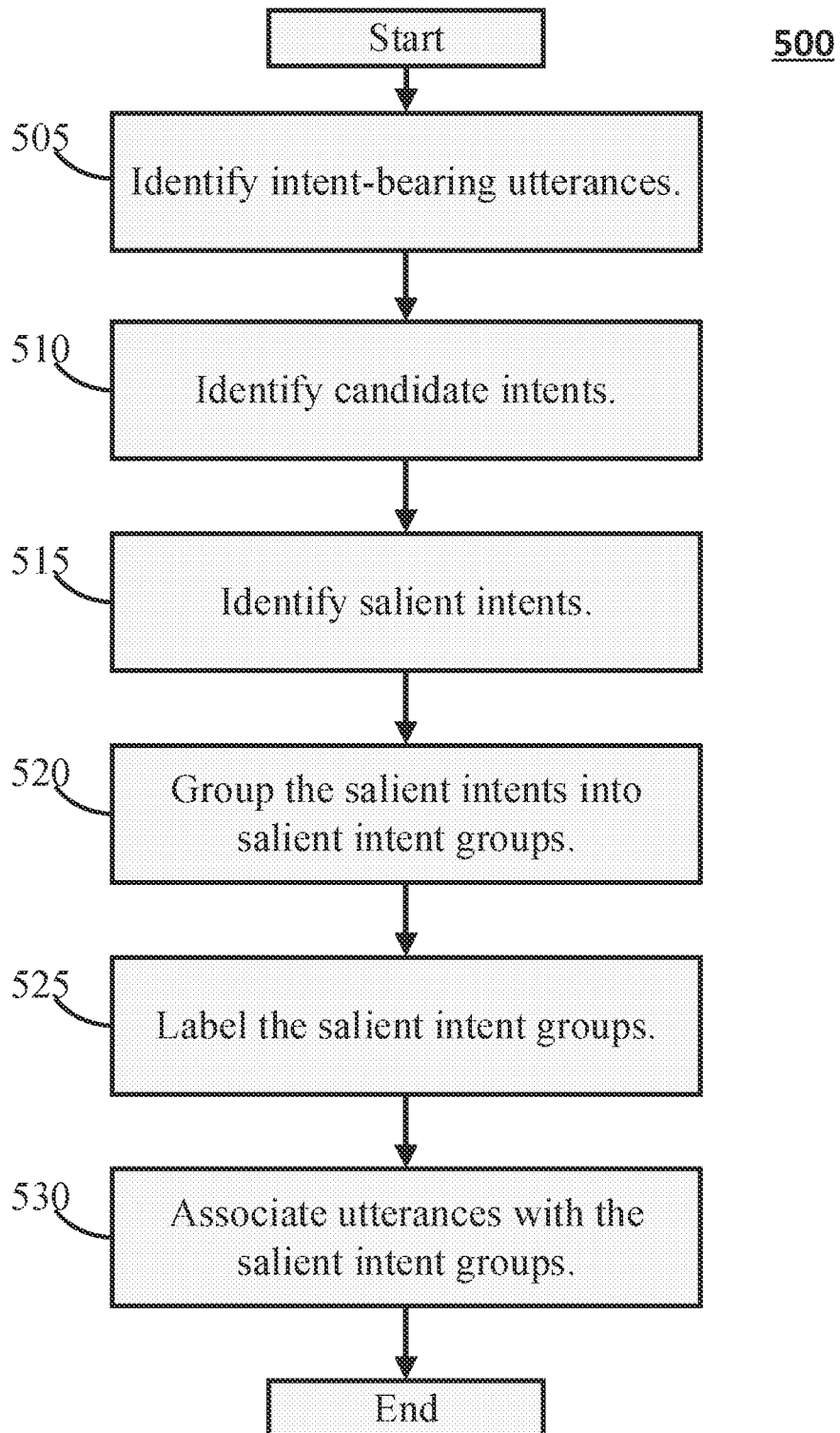
FIG. 9 is an exemplary flowchart for intent mining in accordance with the present invention.

With reference now to FIG. 9, an exemplary algorithm for implementing the present intent mining engine or process 500 will now be discussed. As will be seen, this algorithm may be approximately broken down into several steps, with will be referred to herein as: 1) identifying intent-bearing utterances; 2) generating candidate intents; 3) identifying salient intents; 4) semantic grouping of intents; 5) intent labeling; and 6) utterance-intent association. Other steps may include the masking of personally identifiable information in utterances. Another additional step may include the computation of intent analytics. These steps will now be discussed. As will be seen, the steps will be described in relation to imported conversation data, for example, data that includes natural language conversations between customers interacting with customer service representatives or agents, though it should be appreciated that the process also may be applicable to other contexts as well involving other types of users and conversation types.

In accordance with a first step 505, the present intent mining process processes the conversation data to identify intent-bearing turns or utterances. As used herein, intent-bearing utterances are those utterances that are determined to likely include or describe an intent of the customer. Thus, this initial step in the present intent mining process is to identify the intent-bearing utterances from the given conversations. For example, a conversation typically consists of multiple message turns or utterances from multiple parties such as an agent (which may include an automated system or bot or human agent) and a customer.

As an example, a bot-generated message might look like this: "Hello, thank you for contacting us. All chats may be monitored or recorded for quality and training purposes. We will be with you shortly to help you with your request". Such bot-generated messages can be safely discarded as they tend to be generic and throw no light into intents found in a conversation. The actual conversation begins with either the agent or customer sending a substantive communication or message. For example, during an interaction, a customer may explain the reason or the "intent" for contacting the customer care. Subsequent agent-customer conversational turns take place based on this intent expressed by the customer.

From the analysis of real-world customer-agent conversations, the present invention includes several heuristics or strategies for identifying intent-bearing utterances. For example, it has been observed that intent-bearing turns typically occurs towards the beginning of the customer side of the conversation. Hence, only a few of the initial customer utterances generally need to be processed to identify the intent, and the rest of the conversation can be discarded. This further helps in reducing the latency and memory footprints of the system. Further, word-count constraints may be used to discard other utterances as being unlikely to include a customer intent.

As an example, identification of intent-bearing utterances may include the following. A set of consecutive customer utterances in the conversation is selected. This set may include the customer utterances occurring within the beginning of the conversation. Additionally, a word-count constraint may be used to disqualify some of the customer utterances within this initial set. That is, to qualify, the number of words in each turn must be greater than a minimum threshold. Such a word-count or length constraint helps to discard some customer turns that are irrelevant for intent mining purposes, such as customary greetings like "Hello", "Hi there", "How are you?", etc. For example, this minimum word-count threshold may be set at between 2 and 5.

The present intent mining process may concatenate the utterances from the consecutive customer turns of the intent-bearing turns into a single combined utterance. Before this is done, each of the customer turns may be pruned based on a maximum length threshold, as longer sentences tend to not to be coherent or produce noisy results. As an example, the maximum number of words per utterance may be set at 50 words. Thus, at the end of this step, a combined utterance is obtained from each conversation that likely contains the intent expressed by the customer. If a conversation does not contain message turns that meet the above criteria, it may be discarded without obtaining a combined utterance from it. Since the present intent mining process is used to obtain the dominant intents from several hundreds or even thousands of conversations, it may be safely assumed that customer intents are repeated across multiple conversations. Hence, the conversations that fail to meet the above heuristic criteria might be discarded without affecting the system's functionality for the sake of greater robustness in intent identification.

In accordance with a second step 510, candidate intents are generated based on analysis of the combined utterance. That is, once the utterances from the intent-bearing turns are obtained from conversation and combined, the next task includes identifying the possible or likely intents, which will be referred to herein as "candidate intents". As used herein, a candidate intent is a text phrase consisting of two parts: 1) an action, which is a word or a phrase representing a tangible purpose, task or activity, and 2) an object, which represents those words or phrases that the action is going to act or operate upon.

There are different ways to obtain these action-object pairs from utterances. As will be appreciated, the choice may depend on the linguistic model and resources available for a particular language. Typically, for example, a syntactic dependency parser is used to analyze the grammatical structure of an utterance and obtain the relationships between "head" words and "tokens" or the words which modify those heads. These relationships between the tokens of an utterance and their heads, along with their Part-of-Speech (POS) tags, are used to identify the potential or candidate intents for a given utterance.

As an example, the process of obtaining such action-object pairs may include the followings. First, all token and head pairs in an utterance may be obtained using a dependency parser. From those, pairs are selected with the POS tags of the token and its associated head being NOUN and VERB, respectively. The usage of universal POS tags helps to make the system language agnostic and hence expandable to multiple linguistic domains.

The "action" part is usually the token having "verb" as the associated POS tag. If the token is a "base verb" with a "particle" token, then the token forms a "phrasal verb" of an utterance. The associated "particle" token is also included with the verb token. Thus, the entire phrasal verb becomes the action part of the candidate intent. The "object" part is usually the token with "noun" as the associated POS tag. If the token is part of a "compound" with all the constituent tokens having a "noun" POS tag, then the whole compound is taken as the object. Similarly, if the token is part of an adjectival modifier phrase, then the whole phrase is taken as the object. If the token is associated with an appositional modifier, then all the tokens constituting the latter are appended to the current token to form the object part of the candidate intent. If only the universal POS tags are available for a language and not the universal dependencies, then the "verb" and "noun" tokens are taken as the action and object parts, respectively. As a next step, the action-object ordered pairs may be lemmatized to convert the candidate intents into a more standard form. For further normalization, the case of the lemmatized pairs may be lowered.

Thus, one or more normalized action-object pairs may be obtained from each utterance, which together form the candidate intents of the conversations. If no such pair is obtained, that utterance is discarded. With this in mind, consider a first exemplary utterance: "I'm looking to contact the instructor for this course. Can you provide his email please?" In this case, candidate intents may include "contact instructor" and "provide email". Consider a second exemplary utterance: "I just finished my bachelor's program yesterday on my account it says you must complete a graduation application, but when I click it goes to a page that says messages and only shows potential scholarships what should I do?" In this case, candidate intents may include "finish program", "complete graduation application", "say message", and "show potential scholarship".

In accordance with a third step 515, salient intents are identified. As used herein, the term "salient intents" refers to a narrowed list of intents from the candidate intents identified in the previous step, where that narrowing is based on, for example, relevance, significance, definitiveness, and/or noticeability. Thus, from the set of candidate intents, those intents that describe the customers' actual intentions are identified as salient intents. As will be appreciated, this task is not always straightforward. In some cases, the intention of the customer may be implicit in nature. In others, however, there might differing opinions regarding the actual intention of customer, especially in those utterances which contain multiple candidate intents.

Consider the examples provided above. In the case of the first utterance example, it may be argued that both "contact instructor" and "provide email" describe the intention of the customer. And, in the case of second utterance example, the customer has finished his/her bachelor's program and is facing an issue while completing the graduation application. While this intention is more implicit, the closest explicit approximation could be the candidate intent "complete graduation application". The decision whether "contact instructor" or "provide email" should be chosen as the intent of the first utterance, or even whether "finish program" or "complete graduation application" should be chosen as the intent of the second utterance, might be better determined by business logic than by any algorithmic formulation. That is, the bot author might apply the appropriate business logic to reach a final decision on such intents. The bot author may also choose to retain multiple intents or even describe a hierarchy of intents to achieve the appropriate business objectives or goals within a particular business domain.

As the aim is make the bot authoring process more efficient, the present intent mining process may narrow down the list of candidate intents into the most salient ones, which then the bot author may review for appropriateness. In such cases, salience may be defined in multiple ways based on different criteria. For example, according to exemplary embodiments, the frequency of candidate intents in the whole set of utterances could be an indicator of salience, i.e., the higher the number of a candidate intent, the higher the relevance. In accordance with other embodiments of the present invention, a criterion based on Latent Semantic Analysis (LSA) may be used to find the salient intents. LSA is a topic modelling technique used in Natural Language Understanding (NLU) tasks. To do this, each utterance, described in terms of candidate intent action-object pairs, is considered as a document. LSA then analyzes the relationship between these documents and the terms they contain (i.e., the action-object pairs) by producing a set of concepts related to the documents and those included terms. Each concept is described in terms of candidate intents with associated weights. These weights offer insights into the relative prominence of candidate intents within each conceptual group.

As an example, in accordance with the present invention, the process of identifying salient intents may include the following. First, LSA is applied to utterances described in terms of candidate intent action-object pairs with the number of LSA components being set to a predetermined limit, for example, 50. The candidate intents of each conceptual group are then sorted in descending order in relation to their weights and the top candidate intents, for example, the top 5, are selected. The selected candidate intents obtained from each conceptual group are then collated and arranged in descending order in relation to their weights. Duplicate entries are then discarded, with the entry having the higher weight being kept. A predetermined number of these may then be deemed the salient candidate intents or simply "salient intents". The predetermined number may be based on the maximum number of intents that need to be mined. For example, this maximum number of intents may be determined by the present intent mining process based on real-world contact center interaction patterns or be chosen by the bot author based on appropriate business logic and use cases.

In accordance with a fourth step 520, the salient intents are semantically grouped. As will be appreciate, since only the syntactic structure of utterances is used to generate candidate intents, it is possible that many of the salient intents identified by the system are similar in meaning. Semantically similar salient intents, thus, may be grouped together for optimum downstream functionality. The output of the present intent mining process might be used to train Natural Language Understanding (NLU) models which then effectively form the "brain" of a natural language chatbot. For these models to identify intents associated with diverse utterances, the NLU model must be trained by syntactically different, but semantically similar utterances. Hence, the bot authoring process must enable the creation of intents being associated with utterances having adequate diversity. The grouping of semantically similar salient intents helps to produce this diversity in the mined intents.

This step generally includes calculating a semantic similarity between the salient intents, which, as an example, may be completed as follows. First, embeddings or word-embeddings associated with the text of the salient intents are computed. As will be appreciated, such embeddings represent the subject text, e.g., a word, phrase, or sentence, such that semantically similar texts have similar embeddings. Such word-embeddings generally include converting the text data into a numeric format via an encoding process, and various conventional encoding techniques may be used to extract such word-embeddings from the text data. The embeddings can then be efficiently compared to determine a measure of semantic similarity between the texts. As an example, Global Vectors (or "GloVe") is an algorithm that may be used to obtain vector representations for words. A GloVe model, for example, may have 300 dimensions. In example embodiments, the word-embeddings for the salient intents may be computed using Inverse Document Frequency (IDF)-weighted average of GloVe embeddings of the constituent tokens. As will be appreciated, IDF is a numerical statistic reflecting a measure as to whether a term is common or rare in a given document corpus. Used in this manner, the collection of all candidate intents or salient intents can be considered as the document corpus for the purpose of IDF computation here.

Once the word-embeddings for the text of the salient intents is obtained, the word-embeddings may be used to calculate a semantic similarity between pairs of the salient intents. As an example, cosine similarity can be used to provide a measure of semantic closeness between word-embeddings in the higher dimensional space. With this obtained, the salient intents can then be group in accordance to those pairs having a cosine similarity of embeddings greater than a predetermined similarity threshold, which may be set between a range of 0 and 1. As will be appreciated, the higher this threshold is, the less salient intents get grouped together, thereby producing groups that are more homogenous, whereas a lower threshold value would result in more semantically diverse intents being grouped together, producing a less homogenous group. As in the case of choosing the maximum intents mentioned above, this homogeneity value might be pre-set in the system (for example, at 0.8) chosen by the bot author. In the case of the latter, the bot author would be able to view multiple output intents and utterance combinations and choose a value which is appropriate for optimum bot results.

In accordance with a fifth step 525, intent labels are identified. Each of the grouped salient intents (or "salient intent groups") ultimately may be an intent that is mined (or "mined intent"). Thus, for each of these salient intent groups, an intent label is picked to serve as the label or identifier of the mined intent. According to example embodiments, this labeling may be done by computing the IDF of each of the salient intents within a given salient intent group. For this calculation, the utterances, described in terms of candidate intents, are taken as the documents, and the action-object pairs, taken as single units, are considered as the constituent tokens. The salient intent of each group having the highest calculated IDF is then made the intent exemplar or "intent label" for the group, while the other salient intents within the group are referred to as the "intent alternatives".

In accordance with a sixth step 530, utterances are associated with the mined intents (each of the mined intents reflected at this point by the intent labels and respective salient intent groups). As will be appreciated, this next step determines the utterances that are associated with each of the mined intents. Like in a previous step, a semantic similarity technique using embeddings may also be employed here. For example, semantic similarity is computed between the candidate intents derived from each of the intent-bearing utterances and each of the salient intents within a given salient intent group. An utterance is then associated with that given salient intent group (which may also be referred to as a mined intent or, simply, intent) if the similarity of any of its constituent candidate intents is the highest with a salient intent of that salient intent group and is also determined to be above a minimum threshold (e.g., 0.8). Further, with respect each of the salient intent groups, the candidate intent of the intent bearing utterance that produced the highest similarity with each particular salient intent group may be brought into that particular salient intent group as an "intent auxiliary". Again, a minimum threshold may also be required. Thus, within this step, a particular intent bearing utterance is associated with one of the salient intent groups, while the constituent candidate intents of that particular intent bearing utterance are associated with respective salient intent groups as intent auxiliaries. Thus, each mined intent may include an intent label, as previously described, as well as one or more intent alternatives and/or one or more intent auxiliaries. As will be appreciated, such a formulation does not prevent the possibility of single intent-bearing utterance becoming associated with multiple intent groups. This is because a single intent-bearing utterance may have multiple candidate intents that are added as intent auxiliaries to different across multiple mined intents. This introduces greater flexibility and robustness in downstream functionalities. The bot author may choose to keep or discard such utterances from one or more groups. It has been observed that utterances repeating across multiple intents help to teach NLU models about the inherent confusion present in them and, hence, aid in building more realistic and robust models.

In accordance with another step (not picture), personally identifiable information in the utterances is removed or masked. To ensure privacy of customers, all personally identifiable information that is present in the associated utterances are masked. Of course, this step can be omitted if the input conversations are anonymized before being provide to the present intent mining process. Such personally identifiable information may include customer names, phone numbers, email addresses, social security, etc. In addition to this, entities related to geographical location, dates and digits may be masked as an additional precaution. For example, consider this utterance: "Hi, I need to book a flight from Washington D.C. to Miami on August 15 under the name of John Honai." After masking, the utterance may become: "Hi, I need to book a flight from <GEO> <GEO> to <GEO> on <DATE> <DATE> under the name of <PERSON> <PERSON>." In addition to safeguarding privacy, such masking may allow the bot author to quickly identify the different entities present in the utterances of intents. This may help the bot author create similar utterances but with varied slot values for these entities. This leads to a greater diversity in utterances, which further helps in the creation of better NLU models.

In accordance with another possible step (not pictured), intent analytics may be computed. That is, apart from mining intents and associated utterances, the present intent mining process also may produce analytics and metrics in relation to the conversation data that assists businesses to identify customer interaction patterns. Two such metrics are as follows.

A first analytic is an intent volume analytic, which is an analytic regarding the extent to which conversations deal with a specific intent. This analytic may also be expressed in terms of a percentage. The intent volume analytic may assist in understanding the relative importance of an intent based on the frequency of its occurrence in the conversation data. Since only a single utterance is taken from each conversation, this metric essentially becomes the number of utterances belonging to each intent.

A second analytic is an intent duration analytic, which is an analytic regarding the duration of conversations dealing with a specific intent. This analytic may also be expressed in terms of a percentage. As will be appreciated, this metric helps to compare intents based on the total conversational time associated with them. The time taken for a conversation is computed as the difference between the last and the first customer/agent turns time stamps. The sum of durations of individual conversations belonging to an intent gives the duration of that intent. As will be appreciated, this type of analytic may assist the bot author and business to better understand customers and contact center staffing.

An example will now be discussed of a method for authoring a conversational bot and intent mining. The method may include: receiving conversation data, with the conversation data including text derived from conversations between a customer and a customer service representative; using an intent mining algorithm to automatically mine intents from the conversation data, each of the mined intents including an intent label, intent alternatives, and associated utterances; and uploading the mined intents into the conversational bot and using the conversational bot to conduct automated conversations with other customers.

In accordance with exemplary embodiments, intent mining algorithm may include analyzing utterances occurring within the conversations of the conversation data to identify intent-bearing utterances. The utterances each may include a turn within the conversations whereby the customer, in the form of a customer utterance, or the customer service representative, in the form of a customer service representative utterance, is communicating. And, an intent-bearing utterance is defined as one of the utterances determined to have an increased likelihood of expressing an intent. The intent mining algorithm may further include analyzing the identified intent-bearing utterances to identify candidate intents. The candidate intents may be each identified as being a text phrase occurring within one of the intent-bearing utterances that has two parts: an action, which may include a word or phrase describing a purpose or task, and an object, which may include a word or phrase describing an object or thing upon which the action operates. The intent mining algorithm may further include selecting, in accordance with one or more criteria, salient intents from the candidate intents. The intent mining algorithm may further include grouping the selected salient intents into salient intent groups in accordance with a degree of semantic similarity between the salient intents. The intent mining algorithm may further include for each of the salient intent groups, selecting one of the salient intents as the intent label and designating the other of the salient intents as the intent alternatives. The intent mining algorithm may further include associating the intent-bearing utterances with the salient intent groups via determining a degree of semantic similarity between the candidate intents present in the intent-bearing utterance and the intent alternatives within each of the salient intent groups. The mined intents each may include a given one of the salient intent groups, each of which being defined by: the one of the salient intents that is selected as the intent label and the other of the salient intents that are designated as the alternative intents; and the intent-bearing utterances that are associated with the given one of the salient intent groups.

In accordance with exemplary embodiments, step of identifying the intent-bearing utterances may include selecting a first portion of the customer utterances as the intent-bearing utterances and discarding a second portion of the customer utterances within the conversation data. The first portion of customer utterances may be defined as a predetermined number of consecutive customer utterances occurring at a beginning of each of the conversations, and the second portion may be defined as the remainder of each of the conversations.

In accordance with exemplary embodiments, step of identifying the intent-bearing utterances further may include discarding the customer utterances in the first portion of customer utterances that fail to satisfy a word-count constraint. The word-count constraint may include: a minimum word count constraint in which the customer utterances in the first portion of customer utterances having less words than the minimum word count constraint are discarded; and/or a maximum word count constraint in which the customer utterances in the first portion of customer utterances having more words than the maximum word count constraint are discarded. The minimum word count constraint may include a value of between 2 and 5 words. The maximum word count constraint may include a value of between 40 and 50 words.

In accordance with exemplary embodiments, step of identifying intent-bearing utterances may include concatenating the customer utterances occurring within the first portion of each of the conversations into a combined customer utterance.

In accordance with exemplary embodiments, step of identifying candidate intents may include: using a syntactic dependency parser to analyze a grammatical structure of the intent-bearing utterance to identify head-token pairs, each head-token pair including a head word modified by a token word; and using parts-of-speech (hereinafter "POS") tagging to tag parts of speech of the intent-bearing utterances and identifying as the candidate intents the head-token pairs in which the POS tag of the head word may include a noun tag and the POS tag of the token word may include a verb tag.

In accordance with exemplary embodiments, step of selecting the salient intents from the candidate intents may include selecting ones of the candidate intents that are determined to appear more frequently in the intent-bearing utterances than other ones of the candidate intents. The one or more criteria by which the salient intents are selected from the candidate intents may include a criterion based on Latent Semantic Analysis (LSA). The step of selecting the salient intents from the candidate intents may include: generating a set of documents having documents corresponding to respective ones of the candidate intents, wherein each of the documents covers an action-object pair defined by the corresponding one of the candidate intents; generating conceptual groups based on terms appearing in the action-object pairs contained in the set of documents; calculating a weight value for each of the candidate intents for each of the conceptual groups, the weight value measuring a degree of relatedness between the candidate intent of a given one of the documents and a given one of the conceptual groups; and selecting as the salient intents a predetermined number of the candidate intents in each of the conceptual groups based on which produce weight values indicating a higher degree of relatedness.

In accordance with exemplary embodiments, step of grouping of the salient intents in accordance with the degree of semantic similarity may include: calculating an embedding for each of the salient intents, wherein an embedding may include an encoded representation of text in which texts that are semantically similar have similar encoded representations; comparing the calculated embeddings to determining the degree of semantic similarity between pairs of the salient intents; and grouping the salient intents having a degree of semantic similarity above a predetermined threshold. The embedding may be calculated as an Inverse Document Frequency (IDF) average of Global Vectors embeddings of the constituent head-token pairs of the salient intent. The comparing the calculated embeddings may include cosine similarity.

In accordance with exemplary embodiments, step of labeling each of the salient intent groups with the intent identifier may include selecting a representative one of the salient intents within each of the salient intent group.

In accordance with exemplary embodiments, step of associating the utterances from the conversation data with the salient intent groups may include performing a first process repetitively to cover each of the intent-bearing utterances in relation to each of the salient intent groups. If described in relation to an exemplary first case involving first and second salient intent groups and a first intent-bearing utterances that contains first and second candidate intents, the first process may include: computing a degree of semantic similarity between each of the first and second candidate intents and each of the intent alternatives in the first salient intent group; computing a degree of semantic similarity between each of the first and second candidate intents and each of the intent alternatives in the second salient intent group; determining which of the intent alternatives produced the highest computed degree of semantic similarity; and associating the first intent-bearing utterance with whichever of the first and second salient intent groups contains the intent alternative that was determined to produce the highest computed degree of semantic similarity. The step of associating the utterances from the conversation data with the salient intent groups may further include associating the intent alternative producing the highest computed degree of semantic similarity only if the highest computed degree of semantic similarity is also found to exceed a predetermined similarity threshold.

Figure 10:
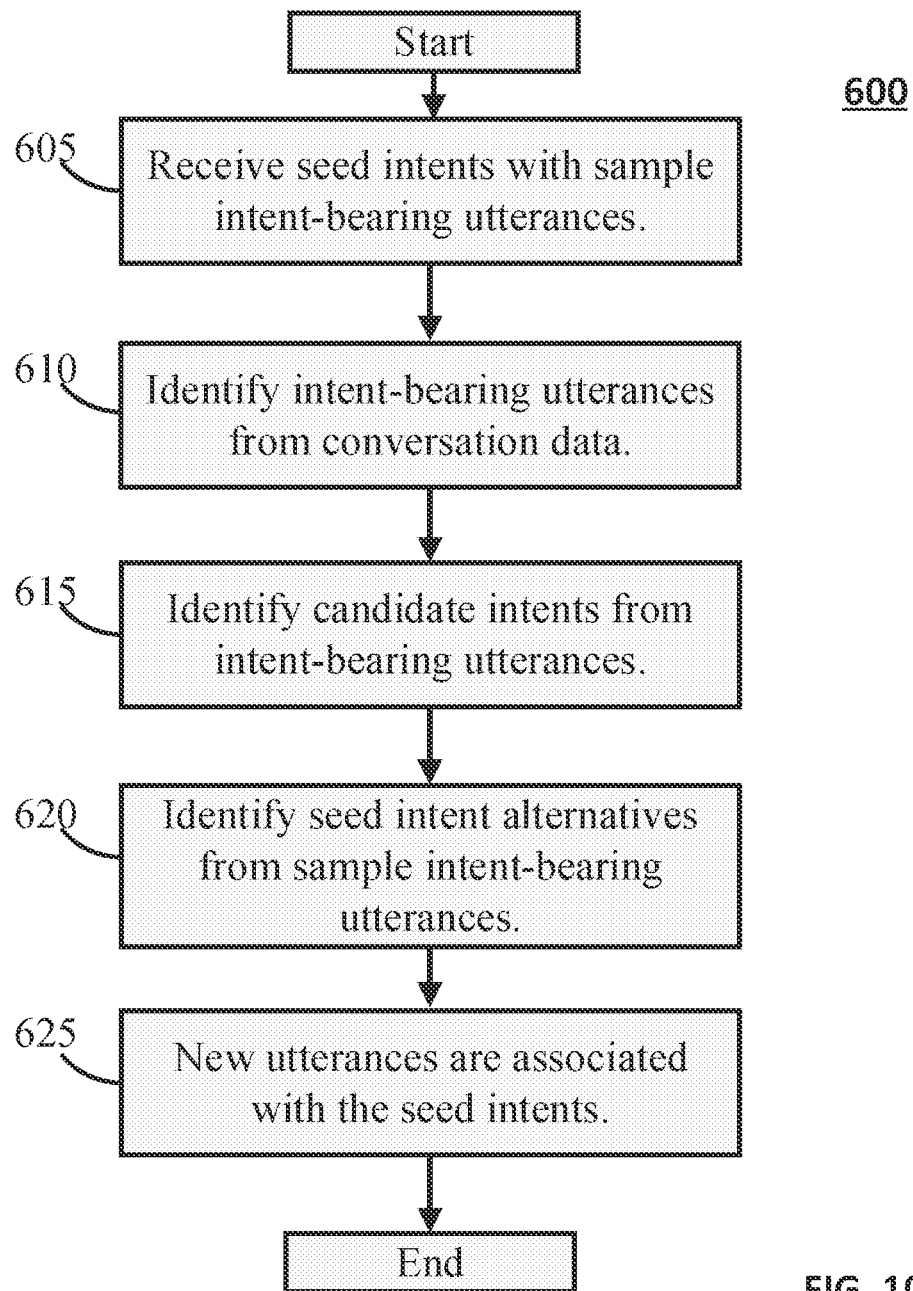
FIG. 10 is an exemplary flowchart for intent mining via seeding intents in accordance with the present invention.

With reference now to FIG. 10, various stages of an alternative bot authoring workflow are shown in which the intent mining method disclosed above in relation to FIG. 9 is augmented with a seeding of intents process. The process of intent mining using an intent seeding process will be discussed below after a brief introduction. For ease of distinguishing reference, the process of intent mining using intent seeding will be referred to hereafter as an "intent mining by seeding process" or simply "intent mining by seeding", whereas the previously discussed process of intent mining (i.e., intent mining without seeding) that was disclosed above in relation to FIG. 9, will be referred to hereafter as a "general intent mining process" or simply "general intent mining".

In a normal mode of operation, general intent mining mines intents—both intent labels and utterances associated therewith—from conversation data, such as a collection of agent-customer conversations. As already discussed, this process is guided by the syntactic structure and semantic content of the conversations. For example, syntactic dependencies and POS tags may be used to find the candidate intents from intent-bearing utterances within the conversations, while methods like Latent Semantic Analysis (LSA) may be used to narrow down the salient intents from the utterances. Intent labels, intent alternatives, and intent auxiliaries are then obtained by associating semantically similar salient intents, which in turn, helps to link utterances to particular intents. As already disclosed, the bot author may use the data mined via general intent mining to train NLU models that then power conversational bots.

It will be appreciated that this general framework of intent mining proceeds from the assumption that the bot author is not aware of the intents that are typically present in the conversation data and/or that NLU models have not already been developed in relation to the collection of conversations or similar conversational domains. Thus, the general intent mining process—for example, a process employing the intent mining engine disclosed above—essentially begins with no prior domain knowledge and derives or mines intents based solely on the conversational content of the data.

Many times, however, this assumption does not apply. That is, a bot author may already have knowledge about the intents in a particular domain. In such cases, a bot author may understand the intents that are typically present in certain conversations or expected to be present in specific conversational domains. This, for example, may be true in banking or travel domains. Further, in many cases, NLU models may have already been trained and bots, like travel or banking bots, have already been published by the bot author. In such scenarios, the existing domain knowledge may be used to guide the intent mining process toward mining specific intents by using an intent seeding process. As will be seen, as part of intent mining by seeding, existing domain knowledge is fed into the mining process in the form of seed intent data. Such seed intent data may consist of intent labels, which may be referred to as a "seed intent" or "seed intent labels", and sample utterances associated with each. The present intent mining process then uses this seed intent data to mine more utterances from the conversation data for each of the seed intents, while also finding utterances for any other salient intents that may be found in the conversation data. As stated, this mining process is referred to herein as an "intent mining by seeding process" or simply, "intent mining by seeding".

As will be seen, intent mining by seeding may assist bot authors to quickly identify more utterances belonging to seed intents, which might be used to train or improve NLU models. Since such systems can mine other salient intents in addition to the given seed intents, this process may help bot authors identify changing customer intents for different time frames.

As with the general intent mining method discussed above, the process of intent mining with seeding intents may be initiated via importing conversation data. In general, other steps of the present intent mining by seeding may be the same or similar to those steps disclosed above in relation to general intent mining. Thus, in the interest of compact explanation, primary attention will be paid to those areas where intent mining by seeding differs from the general intent mining process that was presented above in relation to FIG. 9.

In accordance with the present invention, intent mining by seeding uses seed intent data. Seed intent data, as used herein, includes one or more seed intents and, for each of the one or more seed intents, a set of associated sample utterances. Intent mining by seeding then processes the seed intent data with conversation data to obtain intent alternatives and/or other utterances for associating with the seed intents. Such intent alternatives are obtained in much the same way as generating candidate intents as given in the section above. In this case, the seed intent and the associated sample utterances are considered as intent-bearing utterances offered by a customer within the conversation data. The normalized action-object pairs obtained from them constitute the intent alternatives of each seed intent.

Once intent alternatives are obtained for each seed intent, seed intent auxiliaries are identified from the set of candidate intents derived from the conversation data, as provided in the discussion above related to FIG. 9. In regard to the step of finding seed intent auxiliaries and associating utterances and seed intents, the intent mining by seeding process may be the same or similar to that described above in the general intent mining process. As in the previous section, the semantic similarity technique using embeddings may also be employed here. Similarity may be computed between candidate intents of each of the intent-bearing utterances and the intent alternatives of each seed intent. An intent-bearing utterance is associated with a seed intent if: a) the semantic similarity of any of the intent-bearing utterance's constituent candidate intents is the highest with an intent alternative of that seed intent; and b) the semantic similarity is determined to be above a minimum threshold (for example, above a score of 0.8). Further, as before, the candidate intent producing the highest similarity score in relation to one of the seed intents is brought into the seed intent as an "intent auxiliary" or, more specifically, as a "seed intent auxiliary".

Intent mining by seeding may also include deriving other salient intents found within the conversation data that are different from those intents identified in the seed intent data. In regard to identifying such salient intents, the intent mining by seeding process may be the same or similar to that described above in the general intent mining process. That is, candidate intents are identified, and then those within a conceptual group are sorted in relation to weight, with a predetermined number of the higher weighted candidate intents from the group being selected. Of these selected candidate intents, duplicate entries are discarded, with those entries having the higher weight being the ones that are kept. In completing this step, the intent mining by seeding process may include an additional procedure from that disclosed above in relation to general intent mining. Specifically, this additional procedure includes discarding any of the identified candidate intents that are already been identified as seed intent auxiliaries.

The next step is to find out the utterances associated with the mined intents. Like in the previous section, the semantic similarity technique using embeddings is employed here. Similarity is computed between candidate intents of an utterance and the intents of all the groups. An utterance is associated with an intent group if the similarity of any of its constituent candidate intents is the highest with an intent of that group and is above a minimum threshold (e.g. 0.8). The candidate intent which produced the highest similarity is brought into the group and is termed as an "intent auxiliary". Candidate intents which have already been identified as seed intent auxiliaries are discarded from this exercise.

It should be appreciated that, given the functionality discussed above in regard to intent mining without seeding (i.e., the general intent mining process discussed in relation to FIG. 9) and intent mining with seeding (i.e., the intent mining by seeding process discussed in relation to FIG. 10), several different use cases or applications are possible. In a first case, intent mining is performed with no seeding. This can be used to mine salient intents and the associated utterances thereto from given conversation data. A second case involves a mixed case in which general intent mining and intent mining by seeding is performed. As will be appreciated, this case can be used on given conversation data to mine both salient intents and associated utterances and more utterances for associating with a given set of seed intents. In a third case, intent mining with seeding is used to provided focused mining on a predetermined set of intent seeds. This last case can be used to mine additional utterances for associating with each of the seed intents within the predetermined set.

With specific reference to FIG. 10, a method 600 is provided for intent mining using intent seeds. In exemplary embodiments, the method 600 includes an initial step 605 of receiving seed intents. Each of the seed intents includes an intent label and sample intent-bearing utterances. At a step 610, intent-bearing utterances from conversation data are identified. At a step 615, candidate intents from intent-bearing utterances are selected. At a step 620, seed intent alternatives are identified from the sample intent-bearing utterances. Then, at a step 625, the new utterances are associated with the seed intents. These steps will now be discussed in more detail in the following example.

In accordance with an exemplary embodiment, a computer-implemented method for authoring a conversational bot and intent mining using intent seeding is provided. The method may include: receiving conversation data, the conversation data including text derived from conversations, wherein each of the conversations is between a customer and a customer service representative; receiving seed intent data that may include seed intents, each of the seed intents including a seed intent label and sample intent-bearing utterances associated with the seed intent; using an intent mining algorithm to automatically mine the conversation data to determine new utterances to associate with the seed intent; augmenting the seed intent data to include the mined new utterances associated with the seed intents; and uploading the augmented seed intent data into the conversation bot and using the conversational bot to conduct automated conversations with other customers.

In the case of mining with seed intents, the intent mining algorithm may include analyzing utterances occurring within the conversations of the conversation data to identify intent-bearing utterances. The utterances each may include a turn within the conversations whereby the customer, in the form of a customer utterance, or the customer service representative, in the form of a customer service representative utterance, is communicating. An intent bearing utterance may be defined as one of the utterances determined to have an increased likelihood of expressing an intent. The intent mining algorithm may further include analyzing the identified intent-bearing utterances to identify candidate intents. The candidate intents are each identified as being a text phrase occurring within one of the intent-bearing utterances that has two parts: an action, which may include a word or phrase describing a purpose or task; and an object, which may include a word or phrase describing an object or thing upon which the action operates. The intent mining algorithm may further include, for each of the seed intents, identifying seed intent alternatives from the sample intent-bearing utterances associated with the seed intent. The seed intent alternatives are identified as being a text phrase occurring within one of the sample intent-bearing utterances that may include two parts: an action, which may include a word or phrase describing a purpose or task; and an object, which may include a word or phrase describing an object or thing upon which the action operates. The intent mining algorithm may further include associating the intent-bearing utterances from the conversation data with the seed intents via determining a degree of semantic similarity between the candidate intents present in the intent-bearing utterances and the seed intent alternatives belonging to each of the seed intent labels.

In accordance with exemplary embodiments, step of identifying the intent-bearing utterances may include selecting a first portion of the customer utterances as the intent-bearing utterances and discarding a second portion of the customer utterances within the conversation data. The first portion of customer utterances may be defined as a predetermined number of consecutive customer utterances occurring at a beginning of each of the conversations, and the second portion may be defined as the remainder of each of the conversations. The step of identifying the intent-bearing utterances further may include discarding the customer utterances in the first portion of customer utterances that fail to satisfy word-count constraints. The word-count constraints may include: a minimum word count constraint in which the customer utterances in the first portion of customer utterances having less words than the minimum word count constraint are discarded; and/or a maximum word count constraint in which the customer utterances in the first portion of customer utterances having more words than the maximum word count constraint are discarded.

In accordance with exemplary embodiments, step of identifying candidate intents may include: using a syntactic dependency parser to analyze a grammatical structure of the intent-bearing utterance to identify head-token pairs, each head-token pair including a head word modified by a token word; and using parts-of-speech (hereinafter "POS") tagging to tag parts of speech of the intent-bearing utterances and identifying as the candidate intents the head-token pairs in which the POS tag of the head word may include a noun tag and the POS tag of the token word may include a verb tag.

In accordance with exemplary embodiments, step of identifying seed intent alternatives may include using a syntactic dependency parser to analyze a grammatical structure of the sample intent-bearing utterances to identify head-token pairs, each head-token pair including a head word modified by a token word; and using parts-of-speech (hereafter "POS") tagging to tag parts of speech of the sample intent-bearing utterances and identifying as the candidate intents the head-token pairs in which the POS tag of the head word may include a noun tag and the POS tag of the token word may include a verb tag.

In accordance with exemplary embodiments, step of associating the intent-bearing utterances from the conversation data with the seed intents may include performing a first process repetitively to cover each of the intent-bearing utterances in relation to each of the seed intents, wherein, if described in relation to an exemplary first case involving first and second seed intents and a first intent-bearing utterances that contains first and second candidate intents. The first process may include: computing a degree of semantic similarity between each of the first and second candidate intents and each of the intent alternatives in the first seed intent; computing a degree of semantic similarity between each of the first and second candidate intents and each of the intent alternatives in the second seed intent; determining which of the intent alternatives produced the highest computed degree of semantic similarity; and associating the first intent-bearing utterance with whichever of the first and second seed intents contains the intent alternative that was determined to produce the highest computed degree of semantic similarity.

In an alternative use case, the method of the present invention includes using the intent mining algorithm to automatically mine new intents along with mining new utterances for associating with a given set of seed intents. In such cases, the method may include augmenting the seed intent data to include the mined new intents. In this case, the intent mining algorithm may further include: in accordance with one or more criteria, selecting salient intents from the candidate intents present in the intent-bearing utterances that are not already associated with one of the seed intents (hereinafter "unassociated intent bearing utterances"); grouping the selected salient intents into salient intent groups in accordance with a degree of semantic similarity between the salient intents; for each of the salient intent groups, selecting one of the salient intents as the intent label and designating the other salient intents as intent alternatives; and associating the unassociated intent-bearing utterances from the conversation data with the salient intent groups via determining a degree of semantic similarity between the candidate intents present in the unassociated intent-bearing utterances and the intent alternatives within each of the salient intent groups. The new mined intents each may include a given one of the salient intent groups, each of which being defined by: the one of the salient intents that is selected as the intent label and the other of the salient intents that are designated as the alternative intents; and the unassociated intent-bearing utterances that become associated with the given one of the salient intent groups.

In accordance with exemplary embodiments, step of identifying candidate intents may include: using a syntactic dependency parser to analyze a grammatical structure of the intent-bearing utterance to identify head-token pairs, each head-token pair including a head word modified by a token word; and using parts-of-speech (hereinafter "POS") tagging to tag parts of speech of the intent-bearing utterances and identifying as the candidate intents the head-token pairs in which the POS tag of the head word may include a noun tag and the POS tag of the token word may include a verb tag.

In accordance with exemplary embodiments, one or more criteria by which the salient intents are selected from the candidate intents may include a criterion based on Latent Semantic Analysis (LSA). The step of selecting the salient intents from the candidate intents may include: generating a set of documents having documents corresponding to respective ones of the candidate intents, wherein each of the documents covers an action-object pair defined by the corresponding one of the candidate intents; generating conceptual groups based on terms appearing in the action-object pairs contained in the set of documents; calculating a weight value for each of the candidate intents for each of the conceptual groups, the weight value measuring a degree of relatedness between the candidate intent of a given one of the documents and a given one of the conceptual groups; and selecting as the salient intents a predetermined number of the candidate intents in each of the conceptual groups based on which produce weight values indicating a higher degree of relatedness.

In accordance with exemplary embodiments, step of grouping of the salient intents in accordance with the degree of semantic similarity may include: calculating an embedding for each of the salient intents, wherein an embedding may include an encoded representation of text in which texts that are semantically similar have similar encoded representations; comparing the calculated embeddings to determining the degree of semantic similarity between pairs of the salient intents; and grouping the salient intents having a degree of semantic similarity above a predetermined threshold. The embedding is calculated as an Inverse Document Frequency (IDF) average of Global Vectors embeddings of the constituent head-token pairs of the salient intent. The comparing the calculated embeddings may include cosine similarity.

In accordance with exemplary embodiments, step of associating the unassociated intent-bearing utterances from the conversation data with the salient intent groups may include performing a first process repetitively to cover each of the unassociated intent-bearing utterances in relation to each of the salient intent groups. If described in relation to an exemplary first case involving first and second salient intent groups and a first unassociated intent-bearing utterances that contains first and second candidate intents, the first process may include: computing a degree of semantic similarity between each of the first and second candidate intents and each of the intent alternatives in the first salient intent group; computing a degree of semantic similarity between each of the first and second candidate intents and each of the intent alternatives in the second salient intent group; determining which of the intent alternatives produced the highest computed degree of semantic similarity; and associating the first unassociated intent-bearing utterance with whichever of the first and second salient intent groups contains the intent alternative that was determined to produce the highest computed degree of semantic similarity.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for authoring a conversational bot comprising:
   receiving conversation data, the conversation data comprising text derived from conversations, wherein each of the conversations is between a customer and a customer service representative;
   using an intent mining algorithm to automatically mine intents from the conversation data, each of the mined intents comprising an intent label, intent alternatives, and associated utterances;
   uploading the mined intents into the conversational bot and using the conversational bot to conduct automated conversations with other customers;
   wherein the intent mining algorithm comprises:
      analyzing utterances occurring within the conversations of the conversation data to identify intent-bearing utterances, wherein:
         the utterances each comprise a turn within the conversations whereby the customer, in the form of a customer utterance, or the customer service representative, in the form of a customer service representative utterance, is communicating; and
         an intent-bearing utterance is defined as one of the utterances determined to have an increased likelihood of expressing an intent;
      analyzing the identified intent-bearing utterances to identify candidate intents, wherein the candidate intents are each identified as being a text phrase occurring within one of the intent-bearing utterances that has two parts: an action, which comprises a word or phrase describing a purpose or task, and an object, which comprises a word or phrase describing an object or thing upon which the action operates;
      selecting, in accordance with one or more criteria, salient intents from the candidate intents;
      grouping the selected salient intents into salient intent groups in accordance with a degree of semantic similarity between the salient intents;
      for each of the salient intent groups, selecting one of the salient intents as the intent label and designating the other of the salient intents as the intent alternatives; and
      associating the intent-bearing utterances with the salient intent groups via determining a degree of semantic similarity between: the candidate intents present in the intent-bearing utterance;
   and the intent alternatives within each of the salient intent groups.

2. The method of claim 1, wherein the mined intents each comprises:
   a given one of the salient intent groups, each of which being defined by:
      the one of the salient intents that is selected as the intent label; and
      the other of the salient intents that are designated as the alternative intents; and
   the intent-bearing utterances that are associated with the given one of the salient intent groups.

3. The method of claim 2, wherein the identifying the intent-bearing utterances comprises selecting a first portion of the customer utterances as the intent-bearing utterances and discarding a second portion of the customer utterances within the conversation data; and
   wherein the first portion of customer utterances is defined as a predetermined number of consecutive customer utterances occurring at a beginning of each of the conversations, and the second portion is defined as the remainder of each of the conversations.

4. The method of claim 3, wherein the identifying the intent-bearing utterances further comprises discarding the customer utterances in the first portion of customer utterances that fail to satisfy a word-count constraint; and
   wherein the word-count constraint comprises at least one of:
      a minimum word count constraint in which the customer utterances in the first portion of customer utterances having less words than the minimum word count constraint are discarded; and
      a maximum word count constraint in which the customer utterances in the first portion of customer utterances having more words than the maximum word count constraint are discarded.

5. The method of claim 4, wherein the step of identifying intent-bearing utterances comprises concatenating the customer utterances occurring within the first portion of each of the conversations into a combined customer utterance; and
   wherein:
      the minimum word count constraint comprises a value of between 2 and 5 words; and
      the maximum word count constraint comprises a value of between 40 and 50 words.

6. The method of claim 2, wherein the step of identifying candidate intents comprises:
   using a syntactic dependency parser to analyze a grammatical structure of the intent-bearing utterance to identify head-token pairs, each head-token pair comprising a head word modified by a token word;
   using parts-of-speech (hereinafter "POS") tagging to tag parts of speech of the intent-bearing utterances and identifying as the candidate intents the head-token pairs in which the POS tag of the head word comprises a noun tag and the POS tag of the token word comprise a verb tag.

7. The method of claim 6, wherein the selecting the salient intents from the candidate intents comprises selecting ones of the candidate intents that are determined to appear more frequently in the intent-bearing utterances than other ones of the candidate intents.

8. The method of claim 6, wherein the one or more criteria by which the salient intents are selected from the candidate intents comprises a criterion based on Latent Semantic Analysis.

9. The method of claim 6, wherein the selecting the salient intents from the candidate intents comprises:
generating a set of documents having documents corresponding to respective ones of the candidate intents, wherein each of the documents covers an action-object pair defined by the corresponding one of the candidate intents;
generating conceptual groups based on terms appearing in the action-object pairs contained in the set of documents;
calculating a weight value for each of the candidate intents for each of the conceptual groups, the weight value measuring a degree of relatedness between the candidate intent of a given one of the documents and a given one of the conceptual groups; and
selecting as the salient intents a predetermined number of the candidate intents in each of the conceptual groups based on which produce weight values indicating a higher degree of relatedness.

10. The method of claim 9, wherein the grouping of the salient intents in accordance with the degree of semantic similarity comprises:
calculating an embedding for each of the salient intents, wherein an embedding comprises an encoded representation of text in which texts that are semantically similar have similar encoded representations;
comparing the calculated embeddings to determining the degree of semantic similarity between pairs of the salient intents; and
grouping the salient intents having a degree of semantic similarity above a predetermined threshold.

11. The method of claim 10, wherein the embedding is calculated as an Inverse Document Frequency average of Global Vectors embeddings of the constituent head-token pairs of the salient intent;
wherein the comparing the calculated embeddings comprises cosine similarity; and
wherein the labeling each of the salient intent groups with the intent identifier comprises selecting a representative one of the salient intents within each of the salient intent group.

12. The method of claim 6, wherein the associating the utterances from the conversation data with the salient intent groups comprises performing a first process repetitively to cover each of the intent-bearing utterances in relation to each of the salient intent groups, wherein, if described in relation to an exemplary first case involving first and second salient intent groups and a first intent-bearing utterances that contains first and second candidate intents, the first process includes:
computing a degree of semantic similarity between each of the first and second candidate intents and each of the intent alternatives in the first salient intent group;
computing a degree of semantic similarity between each of the first and second candidate intents and each of the intent alternatives in the second salient intent group;
determining which of the intent alternatives produced the highest computed degree of semantic similarity; and
associating the first intent-bearing utterance with whichever of the first and second salient intent groups contains the intent alternative that was determined to produce the highest computed degree of semantic similarity.

13. The method of claim 12, wherein the associating the utterances from the conversation data with the salient intent groups comprises associating the intent alternative producing the highest computed degree of semantic similarity only if the highest computed degree of semantic similarity is also found to exceed a predetermined similarity threshold.

14. A system for automating aspects of authoring a conversational bot, the system comprising:
a processor; and
a memory, wherein the memory stores instructions that, when executed by the processor, cause the processor to perform:
receiving conversation data, the conversation data comprising text derived from conversations, wherein each of the conversations is between a customer and a customer service representative;
using an intent mining algorithm to automatically mine intents from the conversation data, each of the mined intents comprising an intent label, intent alternatives, and associated utterances; and
uploading the mined intents into the conversational bot and using the conversational bot to conduct automated conversations with other customers;
wherein the intent mining algorithm comprises:
analyzing utterances occurring within the conversations of the conversation data to identify intent-bearing utterances, wherein:
the utterances each comprise a turn within the conversations whereby the customer, in the form of a customer utterance, or the customer service representative, in the form of a customer service representative utterance, is communicating; and
an intent-bearing utterance is defined as one of the utterances determined to have an increased likelihood of expressing an intent;
analyzing the identified intent-bearing utterances to identify candidate intents, wherein the candidate intents are each identified as being a text phrase occurring within one of the intent-bearing utterances that has two parts: an action, which comprises a word or phrase describing a purpose or task, and an object, which comprises a word or phrase describing an object or thing upon which the action operates;
selecting, in accordance with one or more criteria, salient intents from the candidate intents;
grouping the selected salient intents into salient intent groups in accordance with a degree of semantic similarity between the salient intents;
for each of the salient intent groups, selecting one of the salient intents as the intent label and designating the other of the salient intents as the intent alternatives; and
associating the intent-bearing utterances with the salient intent groups via determining a degree of semantic similarity between: the candidate intents present in the intent-bearing utterance;

and the intent alternatives within each of the salient intent groups.

15. The system of claim 14, wherein the mined intents each comprises:
a given one of the salient intent groups, each of which being defined by:
the one of the salient intents that is selected as the intent label; and
the other of the salient intents that are designated as the alternative intents; and
the intent-bearing utterances that are associated with the given one of the salient intent groups.

16. The system of claim 15, wherein the identifying the intent-bearing utterances comprises selecting a first portion of the customer utterances as the intent-bearing utterances and discarding a second portion of the customer utterances within the conversation data; and
wherein the first portion of customer utterances is defined as a predetermined number of consecutive customer utterances occurring at a beginning of each of the conversations, and the second portion is defined as the remainder of each of the conversations.

17. The system of claim 16, wherein the identifying the intent-bearing utterances further comprises discarding the customer utterances in the first portion of customer utterances that fail to satisfy a word-count constraint; and
wherein the word-count constraint comprises at least one of:
a minimum word count constraint in which the customer utterances in the first portion of customer utterances having less words than the minimum word count constraint are discarded; and
a maximum word count constraint in which the customer utterances in the first portion of customer utterances having more words than the maximum word count constraint are discarded.

18. The system of claim 15, wherein the step of identifying intent-bearing utterances comprises concatenating the customer utterances occurring within the first portion of each of the conversations into a combined customer utterance; and
wherein:
the minimum word count constraint comprises a value of between 2 and 5 words; and
the maximum word count constraint comprises a value of between 40 and 50 words.

19. The system of claim 15, wherein the step of identifying candidate intents comprises:
using a syntactic dependency parser to analyze a grammatical structure of the intent-bearing utterance to identify head-token pairs, each head-token pair comprising a head word modified by a token word;
using parts-of-speech (hereinafter "POS") tagging to tag parts of speech of the intent-bearing utterances and identifying as the candidate intents the head-token pairs in which the POS tag of the head word comprises a noun tag and the POS tag of the token word comprise a verb tag.

20. The system of claim 19, wherein the selecting the salient intents from the candidate intents comprises selecting ones of the candidate intents that are determined to appear more frequently in the intent-bearing utterances than other ones of the candidate intents.

21. The system of claim 19, wherein the one or more criteria by which the salient intents are selected from the candidate intents comprises a criterion based on Latent Semantic Analysis.

22. The system of claim 19, wherein the selecting the salient intents from the candidate intents comprises:
generating a set of documents having documents corresponding to respective ones of the candidate intents, wherein each of the documents covers an action-object pair defined by the corresponding one of the candidate intents;
generating conceptual groups based on terms appearing in the action-object pairs contained in the set of documents;
calculating a weight value for each of the candidate intents for each of the conceptual groups, the weight value measuring a degree of relatedness between the candidate intent of a given one of the documents and a given one of the conceptual groups; and
selecting as the salient intents a predetermined number of the candidate intents in each of the conceptual groups based on which produce weight values indicating a higher degree of relatedness.

23. The system of claim 22, wherein the grouping of the salient intents in accordance with the degree of semantic similarity comprises:
calculating an embedding for each of the salient intents, wherein an embedding comprises an encoded representation of text in which texts that are semantically similar have similar encoded representations;
comparing the calculated embeddings to determining the degree of semantic similarity between pairs of the salient intents; and
grouping the salient intents having a degree of semantic similarity above a predetermined threshold.

24. The system of claim 23, wherein the embedding is calculated as an Inverse Document Frequency average of Global Vectors embeddings of the constituent head-token pairs of the salient intent;
wherein the comparing the calculated embeddings comprises cosine similarity; and
wherein the labeling each of the salient intent groups with the intent identifier comprises selecting a representative one of the salient intents within each of the salient intent group.

25. The system of claim 19, wherein the associating the utterances from the conversation data with the salient intent groups comprises performing a first process repetitively to cover each of the intent-bearing utterances in relation to each of the salient intent groups, and wherein, if described in relation to an exemplary first case involving first and second salient intent groups and a first intent-bearing utterances that contains first and second candidate intents, the first process includes:
computing a degree of semantic similarity between each of the first and second candidate intents and each of the intent alternatives in the first salient intent group;
computing a degree of semantic similarity between each of the first and second candidate intents and each of the intent alternatives in the second salient intent group;
determining which of the intent alternatives produced the highest computed degree of semantic similarity; and
associating the first intent-bearing utterance with whichever of the first and second salient intent groups contains the intent alternative that was determined to produce the highest computed degree of semantic similarity.

26. The system of claim 25, wherein the associating the utterances from the conversation data with the salient intent groups comprises associating the intent alternative producing the highest computed degree of semantic similarity only if the highest computed degree of semantic similarity is also found to exceed a predetermined similarity threshold.

* * * * *